(12) United States Patent
Nielsen

(10) Patent No.: US 12,419,325 B2
(45) Date of Patent: Sep. 23, 2025

(54) APPARATUS AND METHOD FOR PREPARING A FOOD MATERIAL

(71) Applicant: DANA—TECHNOLOGY APS, Tommerup (DK)

(72) Inventor: Lars Christian Nielsen, Vejle Ø (DK)

(73) Assignee: DANA—TECHNOLOGY APS, Tommerup (DK)

( * ) Notice: Subject to any disclaimer, the term of this patent is extended or adjusted under 35 U.S.C. 154(b) by 749 days.

(21) Appl. No.: 17/633,625

(22) PCT Filed: Aug. 11, 2020

(86) PCT No.: PCT/EP2020/072545
§ 371 (c)(1),
(2) Date: Feb. 8, 2022

(87) PCT Pub. No.: WO2021/028446
PCT Pub. Date: Feb. 18, 2021

(65) Prior Publication Data
US 2022/0287326 A1    Sep. 15, 2022

(30) Foreign Application Priority Data
Aug. 12, 2019  (DK) .............................. PA 201900943

(51) Int. Cl.
*A23J 3/22*      (2006.01)
*A23P 30/00*     (2016.01)
(Continued)

(52) U.S. Cl.
CPC .............. *A23J 3/227* (2013.01); *A23P 30/00* (2016.08); *B01F 27/11252* (2022.01); *B01F 35/92* (2022.01)

(58) Field of Classification Search
CPC . A23P 30/00; A23P 10/00; A23P 30/20; A23J 3/225; A23J 3/227; B01F 27/11252; B01F 27/70
See application file for complete search history.

(56) References Cited

U.S. PATENT DOCUMENTS 3,496,858 A    2/1970  Jenkins
3,940,495 A    2/1976  Flier
(Continued)

FOREIGN PATENT DOCUMENTS

CN    201881576 U    6/2011
EP      2084972 A1    8/2009
(Continued)

*Primary Examiner* — Seyed Masoud Malekzadeh
(74) *Attorney, Agent, or Firm* — DINSMORE & SHOHL LLP

(57) ABSTRACT

An apparatus for texturizing emulsified protein and/or carbohydrate containing food materials into a textured fibrous meat simulating product, said apparatus comprising a treatment assembly comprising: a first stationary disc having an inlet opening for receiving a food material slurry, a second stationary disc arranged underneath the first stationary disc with a predetermined distance between said first and second stationary discs defining a treatment space between the discs, wherein one or both of the first and second stationary discs are configured for being heated; and a rotary paddle wheel with spokes configured for rotating around a rotation axis, wherein the rotary paddle wheel is arranged between the first and second stationary discs for during rotation of the rotary paddle wheel transporting the slurry from the inlet opening to the periphery thereby heating and texturizing the slurry.

29 Claims, 9 Drawing Sheets

(51) Int. Cl.
   *B01F 27/1125*   (2022.01)
   *B01F 35/92*   (2022.01)

(56)            References Cited

U.S. PATENT DOCUMENTS

| | | | | |
|---|---|---|---|---|
| 4,062,987 | A | * | 12/1977 | Hildebolt ................. D01D 5/18 |
| | | | | 426/802 |
| 4,226,576 | A | * | 10/1980 | Hildebolt ................. D01D 5/18 |
| | | | | 425/69 |
| 6,086,239 | A | | 7/2000 | Jarvenkyla et al. |
| 6,783,271 | B1 | | 8/2004 | Makarenko et al. |
| 8,293,297 | B2 | * | 10/2012 | Orcutt ....................... D01F 4/00 |
| | | | | 425/464 |
| 8,328,410 | B1 | | 12/2012 | Retamal |
| 9,907,322 | B2 | * | 3/2018 | McMindes .............. A23P 30/20 |
| 2008/0254199 | A1 | * | 10/2008 | Orcutt ..................... A23P 30/20 |
| | | | | 426/656 |
| 2011/0027403 | A1 | | 2/2011 | Carlson et al. |
| 2014/0116213 | A1 | * | 5/2014 | King .................... B26D 7/0691 |
| | | | | 83/13 |
| 2014/0170283 | A1 | * | 6/2014 | McMindes ............ A23L 13/426 |
| | | | | 426/641 |
| 2015/0315074 | A1 | * | 11/2015 | Ueno ................ B01F 35/75415 |
| | | | | 106/680 |

FOREIGN PATENT DOCUMENTS

| | | |
|---|---|---|
| IN | 205413173 U | 8/2016 |
| WO | 2014001433 A2 | 1/2014 |
| WO | 2014001433 A3 | 1/2014 |

\* cited by examiner

APPARATUS AND METHOD FOR PREPARING A FOOD MATERIAL

CROSS-REFERENCE TO RELATED APPLICATIONS

This application is the U.S. National Stage of PCT/EP2020/072545 filed Aug. 11, 2020, which claims priority to Denmark Patent Application No. PA 201900943 filed Aug. 12, 2019, the content of both of which are incorporated herein by reference in their entirety.

FIELD OF THE INVENTION

The present disclosure relates to a method and apparatus to turn a composition of emulsified protein and/or carbohydrate-containing food materials into textured fibrous meat simulating products typically used within the food industry.

BACKGROUND OF INVENTION

Texturizing protein food materials has been known for many years and has been practiced commercially for various end products.

For example, in U.S. Pat. No. 3,496,858 there is disclosed a method for preparing a protein product, and in U.S. Pat. No. 3,940,495 there is disclosed a protein product and a method for forming same. Both disclosures are using an extrusion technology.

The above cited disclosures are teaching a high pressure extrusion process utilizing mainly vegetable protein sources, such as oilseed meals, under elevated temperatures (+150° C.) and very high pressure (+30 bar).

Furthermore, in the apparatus according to the prior art are utilized mainly for vegetable protein sources, such as oilseed meals.

In the food industry there is an increasing demand for producing nutritious and vegetarian protein food for humans and pets (animals) at a relative low cost and large capacity, compared to the already known production methods.

Recipes for composing emulsified slurry are many and already known. The emulsified slurry is composed with different meat protein, such as mechanically deboned meat, from different animals, fish and insects, as well as protein and/or carbohydrate containing food materials from oil meal or seeds.

Each recipe contains water to achieve the correct moisture content and can have different viscosity, but compositions can also include vitamins, aroma, conservations, or other food approved chemicals and taste enhancing additives.

Accordingly, it is an object for the present invention to provide an improved quality and better controlled low cost method of producing a textured fibrous meat simulating product at a high rate to include compositions of edible meat or purely vegetarian products.

Another object is to avoid the use of an extruder, with the problems normally being attached to the extruding method, as well as texturizing methods involving freezing, but to develop a novel, simple, flexible, easy to clean principle to produce a fibrous meat simulating edible product with an actual meat appearance and a meat like structure, texture and chewing characteristic.

A further object of the method and apparatus is to have a better and more flexible control on texturizing an emulsified composition of slurry into an edible fibrous meat simulating product, which can be used for human, including vegan and vegetarian, and animal (pet-food).

SUMMARY OF INVENTION

The above-mentioned objects are achieved by an apparatus for texturizing emulsified protein and/or carbohydrate containing food materials into a textured fibrous meat simulating product, said apparatus comprising a treatment assembly comprising: a first stationary disc having an inlet opening for receiving a food material slurry, a second stationary disc arranged underneath the first stationary disc with a predetermined distance between said first and second stationary discs defining a treatment space between the discs. One or both of the first and second stationary discs are configured for being heated. A rotary paddle wheel with spokes configured for rotating around a rotation axis, wherein the rotary paddle wheel is arranged between the first and second stationary discs for during rotation of the rotary paddle wheel transporting the slurry from the inlet opening to the periphery thereby heating and texturizing the slurry.

In an embodiment, the apparatus can further comprise a collection channel provided peripherally around the treatment assembly for receiving the treated product being discharged from between the discs. The received treated product can then be automatically directed further to a further treatment machine, like e.g. a slicer, dicer, and/or cutting machine for reducing product size and for further delivery to a packing machine without any manual work involved.

In a second aspect of the invention, there is provided a method of texturing an emulsified protein or carbohydrate containing food materials into a textured fibrous meat simulating product, said method comprising the steps of:

supplying a food material slurry through an inlet opening of a first stationary disc, which is arranged on top of a second stationary disc arranged preferably concentrically underneath the first stationary disc with a predetermined distance between said first and second stationary discs defining a treatment space between the discs, wherein one or both of the first and second stationary discs being heated; and compressing and heating the supplied food material slurry in the treatment space by rotating a rotary paddle wheel around a rotation axis with spokes arranged between the first and second stationary discs for transporting the slurry radially outwards from the centre or inlet opening of the discs to the periphery while heating the slurry and thereby texturizing the slurry and obtaining a textured product at the periphery of the discs.

By the invention it is realised that the invention is capable to texturize all compositions (recipes) of emulsified protein and/or carbohydrate containing food materials. The slurry is fed-in through an opening in the top disc in or around the centre of the first stationary disc. The emulsified food material then passes through a controlled heat treatment as it is shifted, mechanically worked and transported through the texturizing process by a rotating wheel, i.e. the rotary paddle wheel, to develop the meat simulating fibrous texture. The apparatus and the method according to the invention differs from the prior art by not using an extruder or extrusion method to texturize the food product, but operate under low, or no pressure and the texturizing process is developed only by mechanical handling during the heat treatment.

In the present disclosure, when the terms like food material or food materials are used, this also means protein-, carbohydrate- or a mixture of protein and carbohydrate containing food materials. Food material or food materials can be derived from animal products like e.g. meat or totally plant based.

By the invention, there is provided a rotary texturizer which is based on the principles of pressing/rotating/turning and heating technology. The rotary texturizer process is based on transferring mechanical and thermal energy into a meat emulsion in order to coagulate the protein and any potential sources of carbohydrate. Preferably, the first and second stationary discs are horizontally provided. Advantageously by the invention it is made possible to transform simple, meat-based formulas into a much textured meat-alike product.

In an embodiment, the method can further can comprise the step of collecting said finished product in a collection channel provided peripherally around the discs for further processing so that the whole process down to the packing can be made automatic.

In an embodiment, the first stationary disc and/or the second stationary disc can have the shape of a circle. In an embodiment, the first stationary disc and/or the second stationary disc has/have the shape of a non-circle like e.g. a square.

In some preferred embodiments, the diameter of the first and second, heated stationary discs can be between 0.50 to 2.00 m, preferably approx. 1.8 m, and the predetermined distance between the discs is between 5 or 10 to 50 mm, preferably between 5 to 20 mm, and most preferably between 7 mm to 9 mm, between 9 mm to 11 mm, or between 11 mm to 13 mm. Furthermore, the rotary paddle wheel preferably can have a height which is the same as the distance between the two discs.

Advantageously, the rotary paddle wheel comprises spokes formed as cleats such that the food material is scraped and pressed whilst being transported from the centre to the periphery of the discs. Accordingly, different paddle wheels with different spoke patterns may advantageously be provided to differently mechanically move and stir various recipes during the heat treatment, in order to control different handling, length (time) of treatment and various temperatures. In the currently preferred embodiment, the rotary wheel is rotated with a speed of 5 to 30 rpm, preferably 10 to 15 rpm.

In some embodiments of the invention, the rotary paddle wheel can be driven by a central drive shaft connected to a drive source. This may provide an additional advantage as the paddle wheel and the top disc are concentric and can be raised for cleaning purpose. A further advantage may be that the rotating paddle wheel can be made in two half, divided in the middle, in order to be removed quickly for cleaning. As an alternative to a central drive shaft, the rotary paddle wheel may be a drive gear sprocket with at least one drive motor provided to engage the periphery of said wheel.

In an embodiment, the drive source and/or the drive motor(s) can be speed-adjustable. Depending on e.g. the quality of the slurry or food material, the temperature of the first and second stationary discs, the distance between the first and second stationary discs the time until the slurry reaches the desired textured fibrous meat simulating product can vary. If the transition to the desired product is fast, the rotational speed of the drive source and/or the drive motor(s) can be increased and vice versa. In this way, the production can be optimised. The speed-adjustable drive source or the speed-adjustable drive motor(s) can be a stepper motor, a gearmotor a DC motor, or an AC motor.

In the currently preferred embodiments of the invention, both the first and second stationary discs are heated to a temperature of 100-200° C. or 70-120° C. or 60-100° C., preferably 120° C. or most preferably 80° C. or 70° C. Hereby, a good temperature for achieving the texturing is provided. The temperature range of 70-120° C. and preferably 80° C. is suitable for animal based food material, while 60-100° C., and preferably 70° C. have turned out to be suitable for mostly plant-based food material. The lower range for the plant-based food material is due to the less fat in plant-based food material. Animal based food material with a high content of fat should preferably be treated by a temperature in the higher end of temperature range of 70-120° C.

In a preferred embodiment, a multiple set of stationary discs and rotary paddle wheels mounted over the other on a common central shaft. It is found advantageous to have a multiple set of stationary discs and rotary paddle wheels mounted on top of the other on the same shaft using the same feeder and collection of the finished product at the circumference of the unit. This will double, triple or more the capacity and bring up the capacity from 500 kg with a single rotary texturizer to 2000 kg per hour.

Having a multiple set of stationary discs and rotary paddle wheels mounted on top of each other on the same shaft also give the advantage to mix finished product produced out of a different recipes fed into different levels of texturizing units and falling into the same collection bin, i.e. vegetable protein in one unit, ground meat in second and meat chunks in third unit.

In an embodiment, the first and second stationary discs can comprise heating elements for heating the first stationary disc and/or the second stationary disc. The heating element can be channels in the first and/or second stationary discs through which a hot fluid like e.g. oil or water can be transported, or an electric heating element heated by current driven through the electric heating element, or a fire acting on the first and/or second stationary, or hot air or steam blowing on the first and/or second stationary discs.

In an embodiment, the rotary paddle wheel can comprise a first rotary paddle wheel with first spokes, and a second rotary paddle wheel with second spokes, wherein the first rotary paddle wheel is configured to rotate inside the second rotary paddle wheel.

Such an arrangement of the first rotary paddle wheel and the second rotary paddle wheel has turned out to increase the transportation of the food material away from the inlet opening and radially out especially close to the centre of the rotary paddle wheel so that less food material is stuck to the rotary paddle wheel or the stationary discs and new food material can easily without high pressure be introduced through the inlet opening and out between the stationary discs.

In an embodiment, the first rotary paddle wheel can be configured to rotate in one direction and the second rotary paddle wheel is configured to rotate in the opposite direction.

That the first rotary paddle wheel and the second rotary paddle wheel are rotating in opposite direction lowers the time that the second spokes will block transfer of food material from the first rotary paddle wheel to the second rotary paddle wheel. The transfer of food material will be more even and the introduction of slurry through the inlet opening will be smoother and faster. If the temperature varies over the stationary disc(s) it may be important to move the slurry radially faster at some places of the stationary disc(s) than at other places. An advantage with the first rotary paddle wheel and the second rotary paddle wheel moving opposite direction is that the transfer of food material from the first rotary paddle wheel to the second rotary paddle wheel is improved.

In an embodiment, the rotary paddle wheel comprises in addition to the first rotary paddle wheel and the second rotary paddle wheel an intermediate paddle wheel in the same plane as the first rotary paddle wheel and the second rotary paddle wheel and in between the first rotary paddle wheel and the second rotary paddle wheel for further improving the transfer of food material by the rotary paddle wheel. The intermediate paddle wheel can have spokes like the first rotary paddle wheel and the second rotary paddle wheel connected by a rim in the form of a circle on top of the spokes. An indentation in the form of a circle in the first stationary disc can receive the rim. A cogwheel in the first stationary disc above the intermediate paddle wheel can engage the rim for driving the intermediate paddle wheel. The intermediate paddle wheel can instead be driven hydraulically or pneumatically. Preferably, with the intermediate paddle wheel, the first rotary paddle wheel and the second rotary paddle wheel will rotate in the same direction and the intermediate paddle wheel will rotate in the opposite direction for achieving an improved transfer of food materials by the rotary paddle wheel.

In an embodiment, one or both of the first and second stationary discs can have an inner heating element, surrounded by a first outer annular heating element, preferably surrounded by a second outer annular heating element, wherein the heating elements are configured for heating the first and/or second stationary discs.

The different heating elements can be set to different temperatures by each heating element having its own electric heating element or having its own channel for hot oil or steam. Alternatively, the electric heating element or the channel can be more spread apart, where the temperature is supposed to be lower and more densely distributed, where the temperature is supposed to be hotter.

That different parts of the stationary discs are heated to different temperatures have turned out to yield a textured fibrous meat simulating product of good quality. The advantage of having two or three heating elements in one or both of the stationary discs instead of one single heating element in one or both of the stationary discs has also turned out to be that the food material is less prone to be burnt.

In an embodiment, the inner heating element(s) can be configured for heating an inner section of the first stationary disc and/or the second stationary disc comprising between 0 to 40% and 0 to 60% of the radius of the first stationary disc and/or the second stationary disc, wherein the first annular heating element(s) can be configured for heating a first annular section of the first stationary disc and/or the second stationary disc surrounding the inner section, and preferably wherein a second outer annular heating element can be configured for heating a second annular section of the first stationary disc and/or the second stationary disc surrounding the first annular section, wherein the second annular section can comprise between 0 to 15% and 0 to 35% of the radius of the first stationary disc and/or the second stationary disc when measured from the periphery of the first stationary disc and/or the second stationary disc.

In an embodiment, the inner heating element(s) can be configured for being heated to a first temperature, and wherein the first outer annular heating element(s) can be configured for being heated to a second temperature, wherein second temperature can be lower than the first temperature and preferably wherein the second outer annular heating element(s) can be configured for being heated to a third temperature, wherein the third temperature can be lower than the second temperature.

In another embodiment, the first temperature can be 60-100° C., preferably 80° C., wherein the second temperature can be 55-85° C., preferably 70° C., and preferably wherein the third temperature can be 55-75° C., more preferably 65° C.

These temperatures of the first and second temperatures will be suitable for texturizing a slurry of animal protein. Even better the result can be, when one or both of the stationary discs comprise(s) the second outer annular heating element(s) having this third temperature. Depending on e.g. the water content and the temperature of the animal slurry poured into the apparatus, the first, second (and third) temperatures can vary, but generally, the best result is achieved with the first, second (and third) temperatures being 80° C., 70° C., (and 65° C.), respectively.

In another embodiment, the first temperature can be 60-90° C., preferably 70° C., wherein the second temperature can be 45-75° C., preferably 60° C., and preferably wherein the third temperature can be 35-65° C., more preferably 55° C.

These temperatures of the first and second temperatures will be suitable for texturizing a slurry based on only vegetable ingredients. Compared to the temperatures when texturizing a slurry with animal ingredients the temperatures for a slurry based on vegetable ingredients have turned out to have to be lower, otherwise, food materials will be burnt and the texturizing procedure has to be cut off so the stationary discs and the rotary paddle wheel(s) can be cleaned. That will be loss of production time. Even better the result can be, when one or both of the stationary discs comprise(s) the second outer annular heating element(s) having this third temperature. Depending on e.g. the water content and the temperature of the vegetable slurry poured into the apparatus, the first, second (and third) temperatures can vary, but generally, the best result is achieved with the first, second (and third) temperatures being 70° C., 60° C., (and 55° C.), respectively.

In an embodiment, the inlet opening can comprise an inlet heating element configured for heating the inlet opening. When the slurry to be poured into the apparatus for being texturized is cold e.g. because it is taken out of a fridge just before the treatment, the slurry will be exposed to a big temperature difference. The big temperature difference will need especially the inner heating element(s) to have an even higher temperature to counteract the cold slurry, but the hotter inner heating element(s) will more easily cause the slurry to burn. The inlet heating element will solve that problem. To avoid that any slurry gets stuck in the inlet opening, the temperature of the inlet heating element should not exceed around 30° C. to 40° C. below the coagulation temperature of the slurry.

DESCRIPTION OF DRAWINGS

In the following the invention is described with reference to the accompanying drawings, in which.

DETAILED DESCRIPTION OF THE INVENTION

Figure 1:
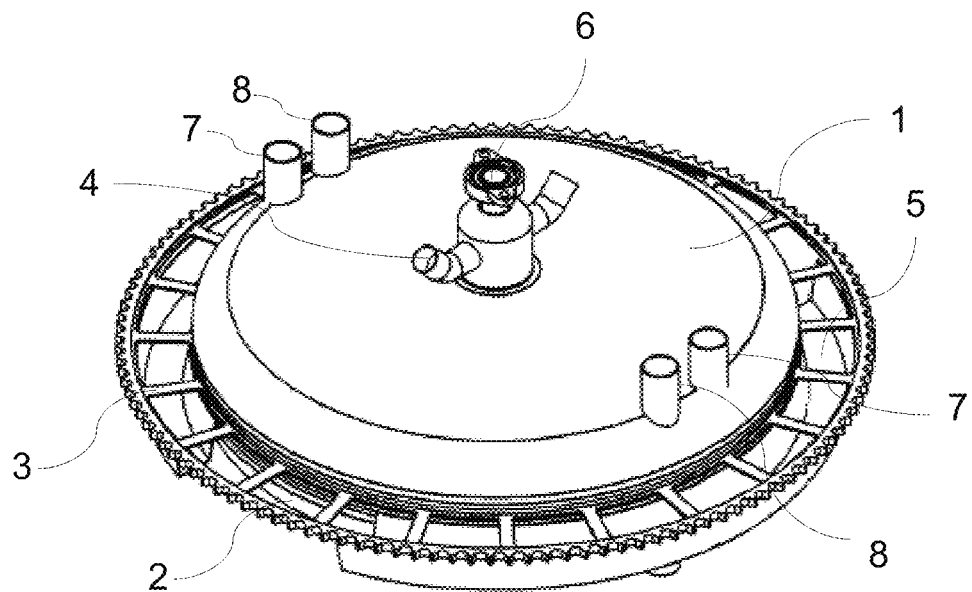
FIG. 1 is a perspective view of a disc assembly in an apparatus for texturizing according to an embodiment of the invention.
Figure 2:
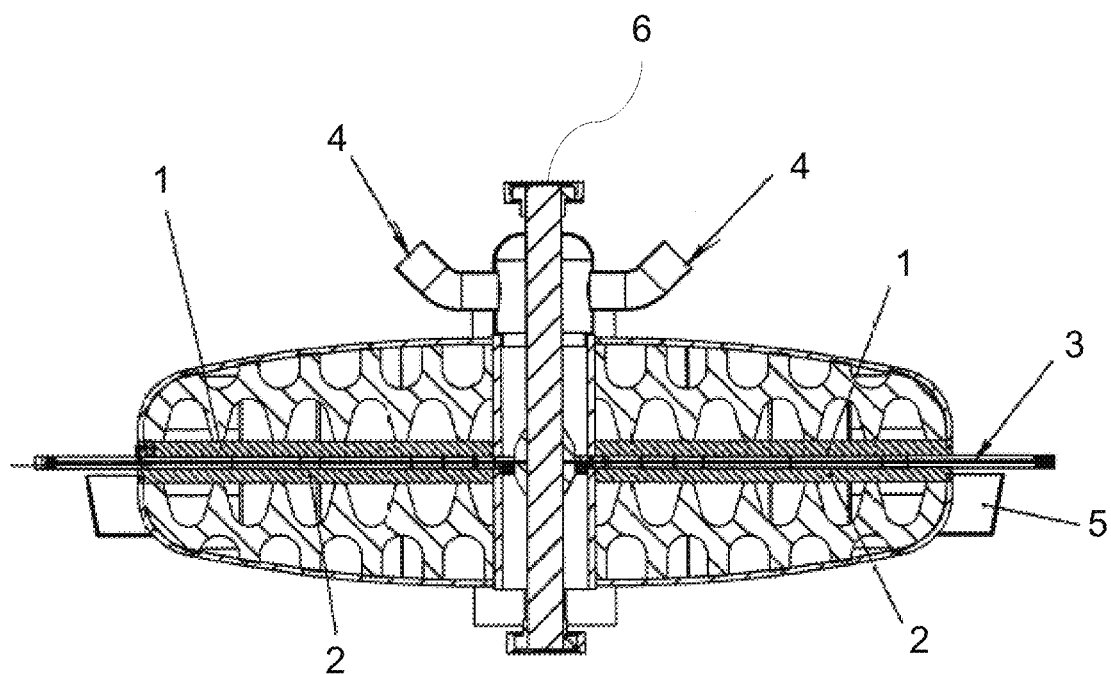
FIG. 2 is a cross-sectional side view of the disc assembly of FIG. 1.

With reference to FIGS. 1 and 2, the rotary texturizing apparatus for texturizing emulsified protein or carbohydrate containing food materials into a textured fibrous meat simulating product comprises a disc assembly wherein the treatment of the food material takes place. The disc assembly comprises a first stationary disc 1, a second stationary disc 2, which is arranged concentrically underneath the first stationary disc 1 with a predetermined distance between the first and second stationary discs 1, 2. In the first stationary disc 1 there is provided an inlet opening 4 for receiving a food material slurry in the central region of the discs 1, 2.

The distance between the discs 1, 2 defines a treatment space between the discs 1, 2. In this space, a rotary paddle wheel 3 rotatable around a rotation axis is arranged between the first and second stationary discs 1, 2 for transporting the slurry from the centre of the discs 1, 2 to the periphery while heating the slurry food material, which is thereby being texturized.

The first and second stationary discs 1, 2 and the rotary paddle wheel 3 can be concentrically arranged on a centre shaft 6. The discs 1, 2 are arranged in a frame 11. The rotation axis and the centre shaft can be coincident.

The first and second stationary discs 1, 2 and the rotary paddle wheel 3 can be removably attached so that the first and second stationary discs 1, 2 and the rotary paddle wheel 3 can be easily removed for cleaning.

Figure 3:
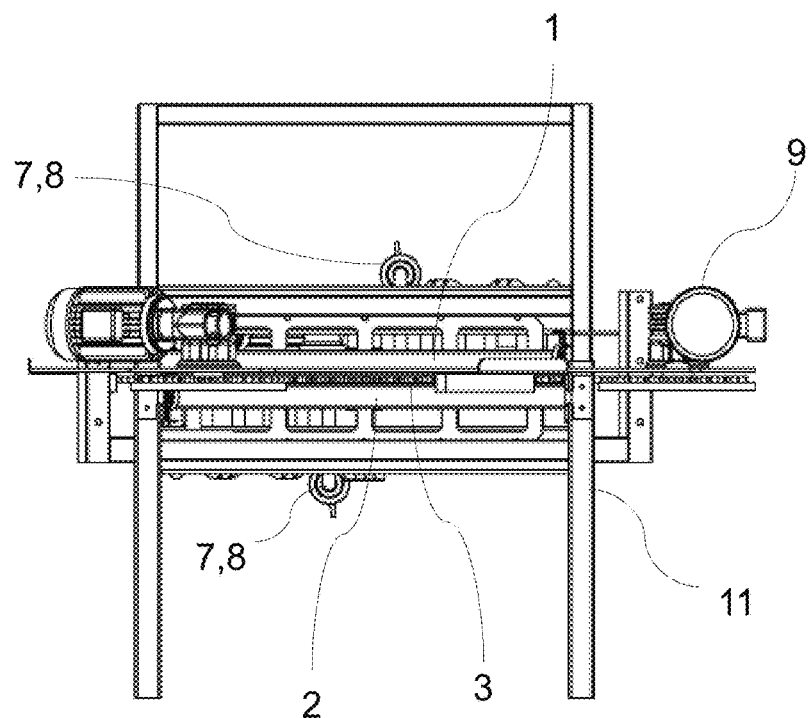
FIG. 3 is a side view of a rotary texturizing apparatus with the disc assembly of FIGS. 1 and 2.
Figure 4:
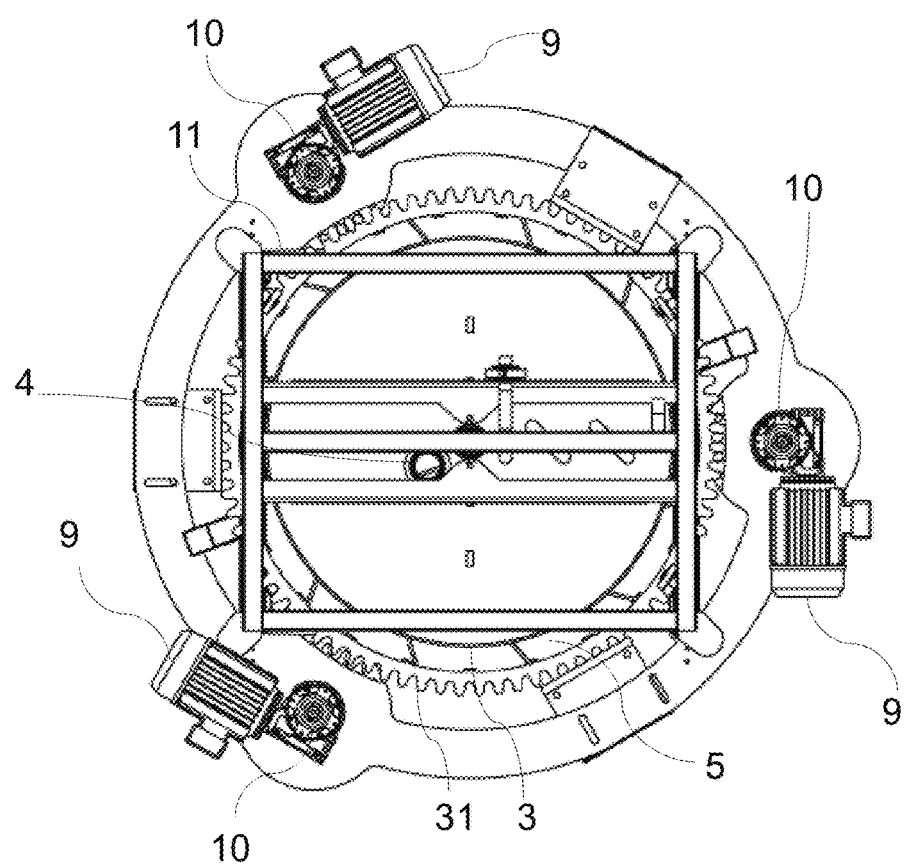
FIG. 4 is a top view of same.

At least one of the first and second stationary discs 1, 2 are heated. In the embodiment shown in FIGS. 1, 3 and 4, the heat treatment is developed by heating both the stationary top and bottom discs 1, 2. The discs have a heating jacket, which can be heated by any heat source, but preferably by hot oil or steam. As shown in the figures, the first stationary disc 1 is provided with a heating media inlet 7 and a heating media outlet 8. The heating media may be heated oil heated to a temperature of up to 180° C. This temperature and supply of heating media may be controlled to ensure that the temperature across the heated discs 1, 2 can be adjusted for either keeping a constant temperature, or a controlled increase or decrease in temperature. The temperature during the texturizing is typically in the range of 100 to 200° C., preferably around 120° C. After some tests, it has turned out that the best results are actually achieved in the range of 70 to 120° C., preferably around 80° C., which also means a lower power consumption.

Around periphery of the second stationary disc 2, a collection channel 5 provided for receiving the treated product which is peripherally discharged from the treatment space between the discs 1, 2 by the rotation of the paddle wheel 3. In the embodiment of FIGS. 1-4, the paddle wheel 3 is provided with a toothed periphery 31 which is engaged by a drive system comprising a gear drive sprocket connected via a gear box 10 to an electric motor 9. In the embodiment shown in FIGS. 3 and 4, three sets of drive systems are arranged to rotate the paddle wheel 3.

Figure 8:
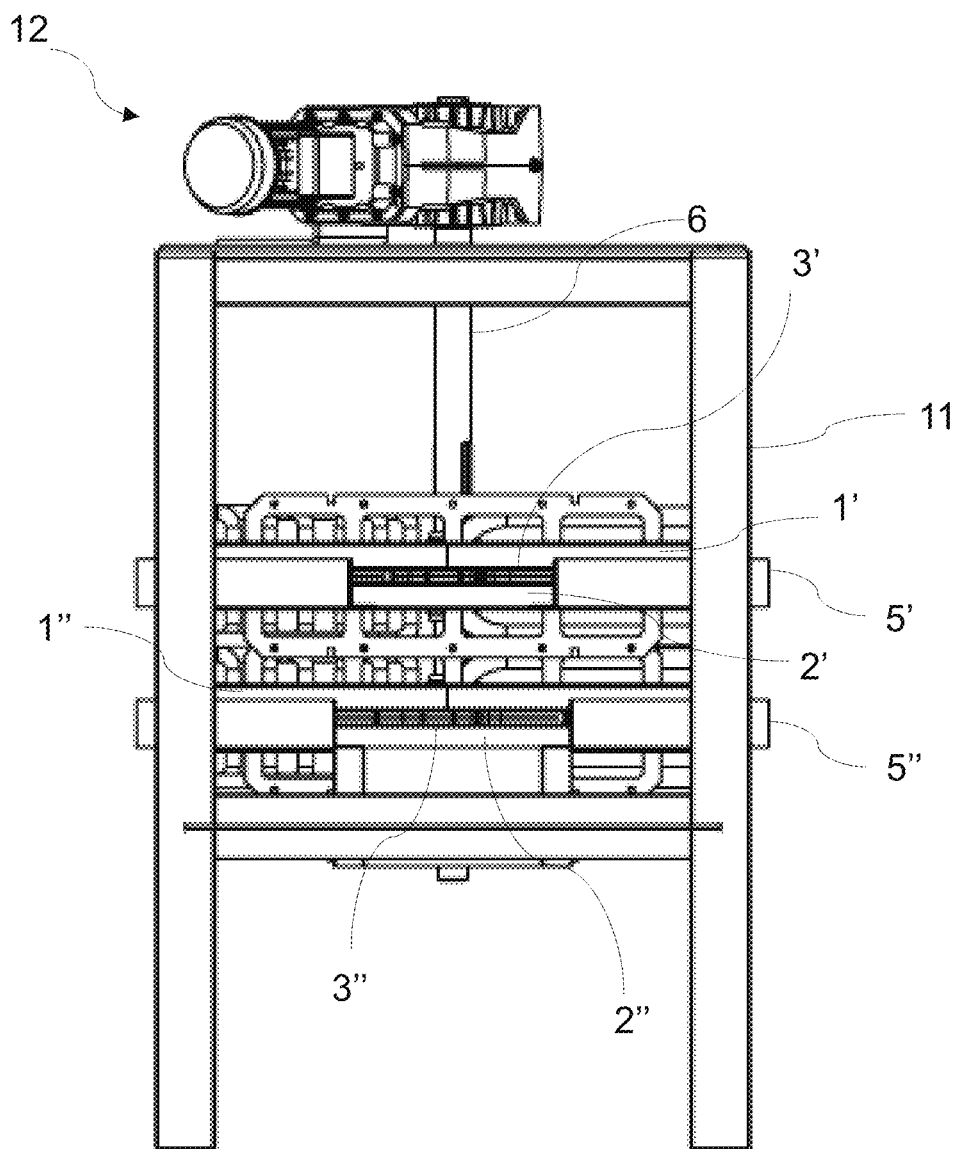
FIG. 8 is a side view of a second embodiment of a rotary texturizing apparatus according to the invention.

In other embodiments, the rotary paddle wheel 3 is driven by a centre shaft 6 and shaft mounted gearbox 12 as shown in FIG. 8.

The rotary texturizer process is based on transferring mechanical and thermal energy into a meat emulsion in order to coagulate the protein and any potential sources of carbohydrate. This makes it possible to transform simple, meat-based formulas into a much textured meat-alike product. The emulsified composition is pumped from a mixing or storage tank (not shown) with low pressure by a positive pump, such as a slurry pump or a sausage filler, into the infeed opening 4 around the centre between the two horizontally positioned heated static discs 1, 2, which in a preferred embodiment have a diameter between 0.5 to 2.0 meter, preferably approx. 1.0 meter.

The slurry is fed-in through an opening 4 in the top disc 1 in or around the centre of the disc 1.

Figure 5:
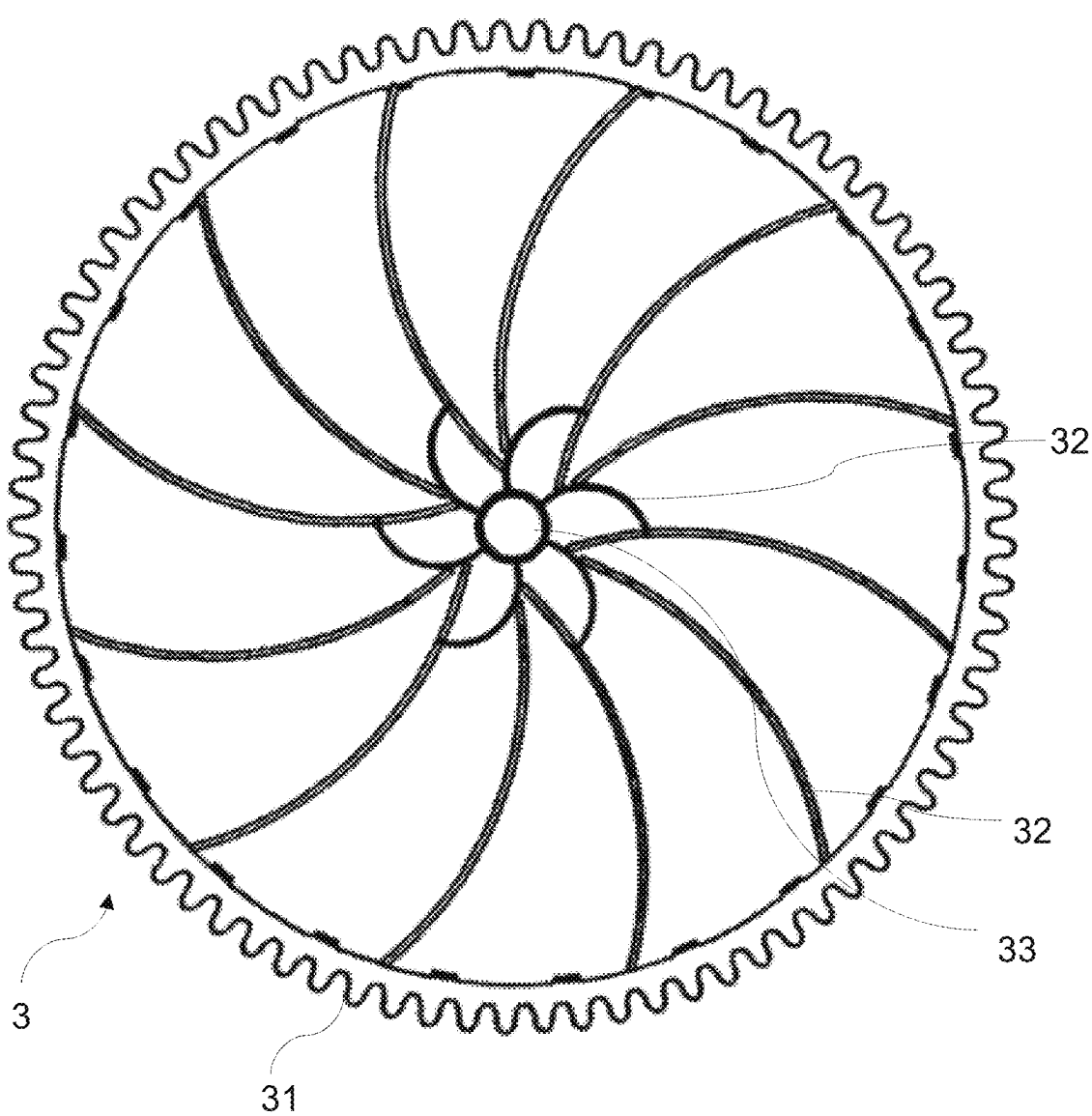
FIG. 5 shows a rotary paddle wheel according to one embodiment of the invention.
Figure 6:
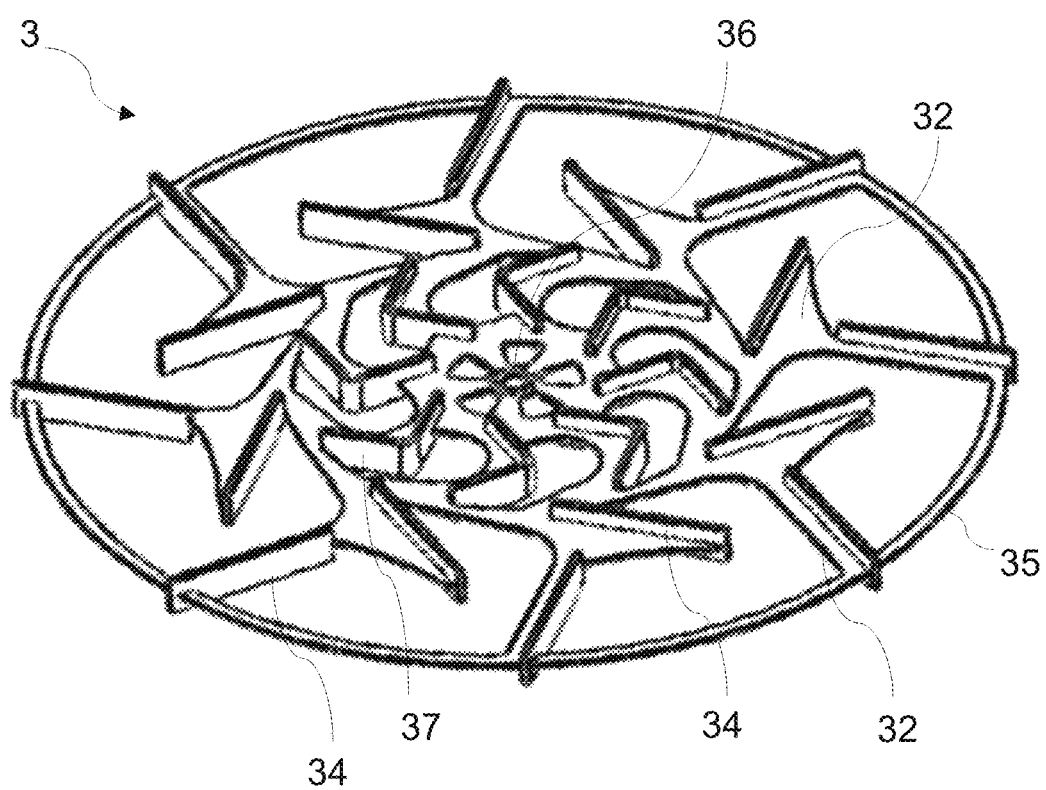
FIG. 6 shows a rotary paddle wheel according to another embodiment of the invention.
Figure 7:
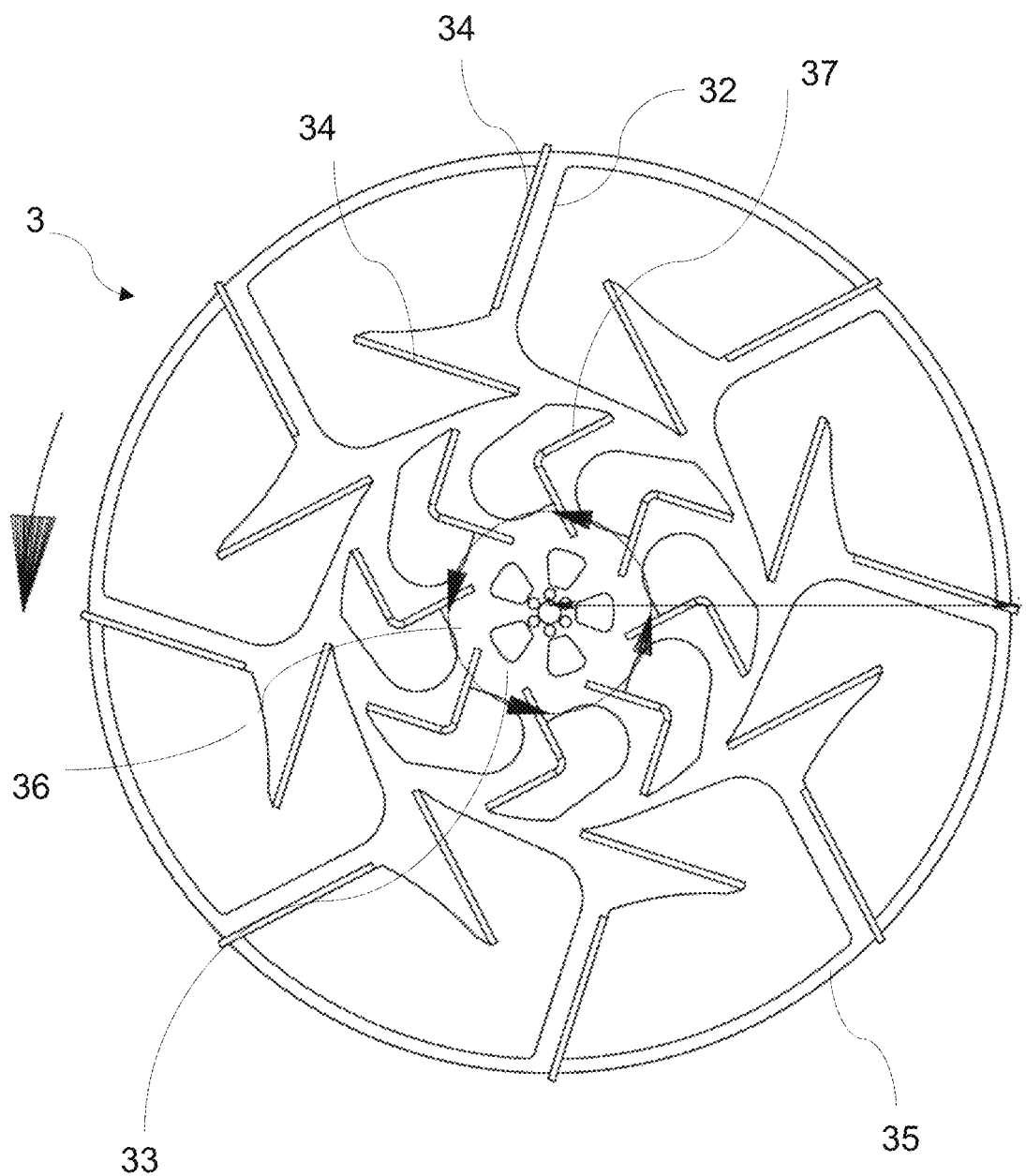
FIG. 7 shows how the material is transported by the rotary paddle wheel.

Between the two stationary discs 1, 2 the rotary paddle wheel 3 is provided with spokes 32 (see FIGS. 5 to 7) between the wheel hub 36 and the wheel rim 35. On the spokes 32 there are provided specially formed cleats 34, 37 e.g. of different height up to the distance between the two discs 1, 2, according to the required result of the finished textured product and/or the viscosity of the slurry composition. On the spokes, inner scraper cleats 37 of one type and one or more outer scraper cleats 34 may be arranged.

The cleats 34, 37 in the paddle wheel 3 are designed and positioned on the spokes 32 to receive and grasp the slurry from the infeed opening 4 in an infeed area 33 and intermittent transport, by scraping the product from the centre of the discs 1, 2 towards the periphery and discharge into the collection channel 5 placed around the treatment assembly. As the product during the interrupted transport is heat treated and at the same time the product is mechanically worked and shifted, which develop the structure of the textured fibrous simulated meat.

When the slurry is fed through the infeed or inlet opening 4 in the top disc 1, in or around the centre of the disc 1 and become in contact with the heated disc 1, 2, it expand slightly and is compressed by the rotation of the cleats 34, 37, whereby the emulsified slurry is worked and shifted, so it will be in contact and heated by both the top and bottom disc 1, 2.

The infeed opening 4 in the top disc 1 is preferably a little off the rotation axis so that the spokes can immediately act on the slurry when the slurry enters the paddle wheel 3 through the inlet opening 4. That the infeed opening 4 is a off the rotation axis means that the infeed area 33 will also be off the rotation axis.

The distance between the top and bottom heating discs 1, 2 is the same as the height of the cleats 34, 37. This distance can varied according to the composition of the slurry and final product, by replacing the cleats 34, 37 or the entire wheel with a higher wheel. This distance between the two heating discs 1, 2, being the same as the heights of the cleats 34, 37 on the rotary paddle wheel 3 is from 10 to 50 mm, preferably between 20 to 30 mm.

In the embodiment, where the paddle wheel 3 can comprise the toothed periphery 31, the toothed periphery can be connected to the distal end of the spokes 32 seen from the centre shaft 6 or the rotation axis of the paddle wheel. Where the toothed periphery and the spokes 32 connect, the toothed periphery and the spokes 32 will form a circle with an inside diameter. Preferably, the second stationary disc 2 has a circumferential edge with a diameter that is less than the inside diameter.

In an embodiment of the invention, the rotary paddle wheel 3 is preferably floating on the drive means, to give a certain pressure on the stationary bottom disc 2, as well as the stationary top disc 1 is preferably floating on the rotary wheel 3 to develop a low pressure on the wheel 3 and the product.

In another embodiment, however, the rotary paddle wheel 3 and the top disc 1 can have a mechanical stop to secure a minimum clearance and thereby less pressure on the product.

In an embodiment, the rotary wheel 3 turns with a speed between 5 and 30 rpm, preferably 10 and 15 rpm and is driven by a centre shaft 6 and shaft mounted gearbox.

Every composition of recipes will often require to be differently mechanical moved and stirred during the heat treatment, as well as different length (time) of treatment and different temperatures.

This can be adapted by the use of different wheels 3 with different shaped spokes 32 and cleats 34, 37 for smooth direct and continuous transport of the product over the heating discs 1, 2, or an interrupted intermittent transport controlled by the size, length, number and direction of the cleats 34, 37. Due to the direction of the cleats 34, 37, i.e. the positive and/or negative angle to the radius line, the product is pushed either in a forward or backwards direction. Thus, the design of the spokes 32 and cleats 34, 37 will control the transport time and how much the product is mechanically worked and shifted during the heating process.

Even in a situation where the direction of most or all of the cleats 34, 37 are positioned with negative angle, the product will still be forced outwards towards the edge of the discs 1, 2, due to the low constant pressure from the infeed product slurry and/or the centrifugal force.

The rotary texturizing process relies on constant flow/pressure and temperature as well as controllable rotation. All these parameters are controlled in an electrical control panel (not shown), which is part of the supply by means of a built in Micro-Processor/PLC-System connected to sensors at the production line collection flow-rate, pressure, rotation and temperature.

As mentioned above, the paddle wheels 3 can be designed to differently mechanically move and stir various recipes during the heat treatment, in order to control different handling, length (time) of treatment and various temperatures. In order to easily alter the design of the wheels 3, the paddle wheel 3 can be made in two half for easy for quick replacement, and also for easy cleaning.

In an advantageous embodiment, the paddle wheel 3 and the top disc 1 can be raised for cleaning purpose. A further advantage is that the rotary paddle wheel 3 can be made in two half, divided in the middle, in order to be removed quickly for cleaning.

The rotary texturizer according to the invention may advantageously also be provided with a "Clean in Place" system (also called a CIP system). Hereby, nozzles are provided in the stationary discs and connected via a high-pressure pump to a liquid reservoir, such as cleaning water, so that the entire inner space can be cleaned and disinfected automatically without having to disassemble the treatment assembly, i.e. lifting the upper stationary disc off. Instead cleaning liquid can be sprayed at high pressure and in suitable high volume through the material inlet. This cleaning operation could be performed at regular intervals.

Figure 9:
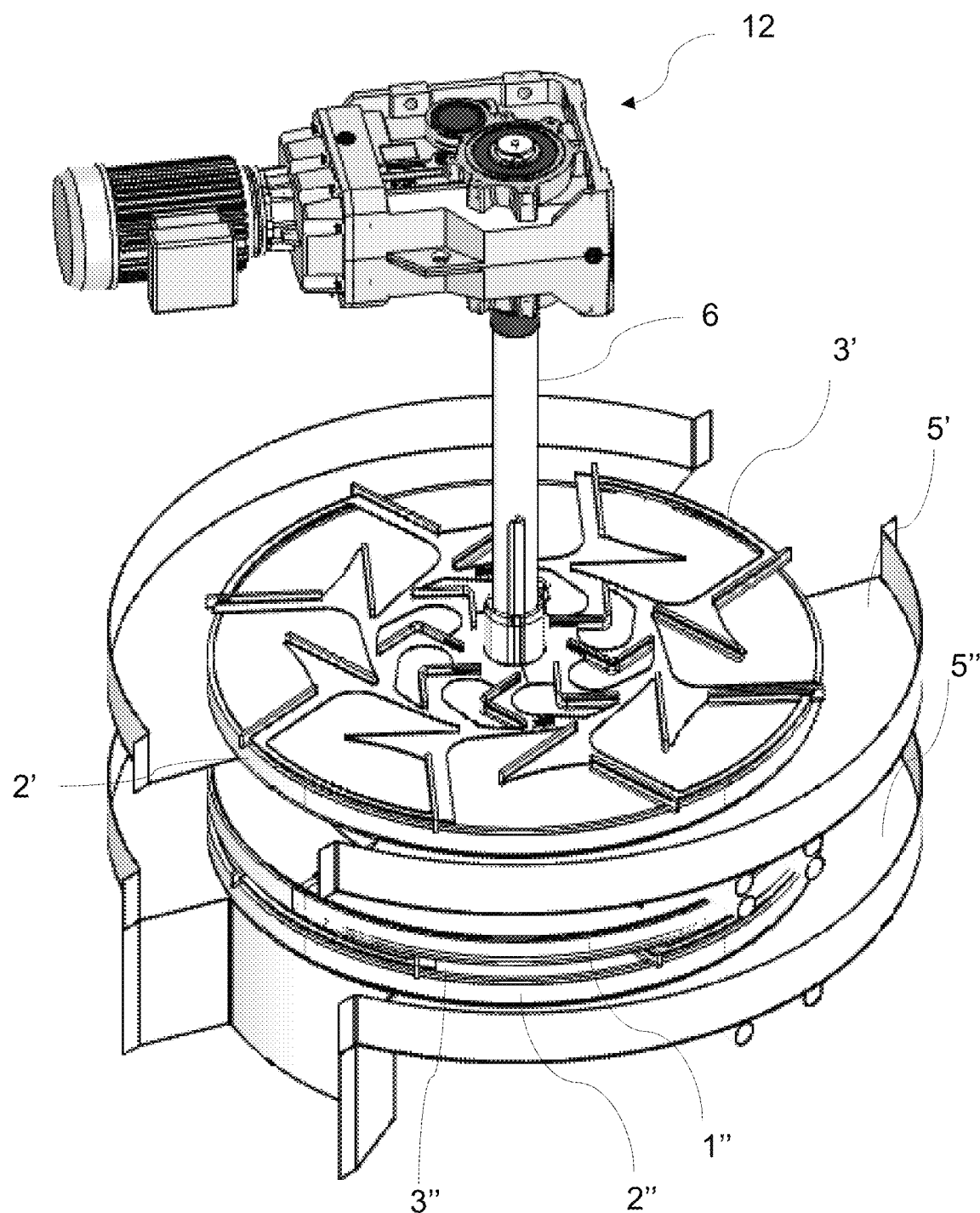
FIG. 9 is a detailed perspective view of the rotary texturizing apparatus of FIG. 8.

With reference to the embodiment shown in FIGS. 8 and 9, a further advantageous embodiment of the invention is to have a multiple set of stationary discs 1', 2'; 1", 2" and rotary paddle wheels 3', 3" mounted over the other on the same shaft 6 using the same feeder and collection of the finished product at the circumference of the unit. This will double, triple or more and bring the capacity up from 500 kg with a single rotary texturizer to 2000 kg per hour.

In FIG. 9 a detailed view of the heating assembly is shown with two sets of treatment assemblies, but where the first stationary disc 1' of the uppermost set is removed. As shown in the figure, the there are two treatment assemblies, an upper assembly and a lower assembly. The upper comprising an upper rotary wheel 3' on top of an upper second stationary disc 2'. The lower assembly similarly comprises a first stationary disc 1", a second stationary disc 2" and with a rotary wheel 3" there between. The upper is surrounded by an upper collection tray 5' and the lower assembly is provided with a lower collection tray 5". The rotary wheels 3' and 3" are both driven by the centrally positioned vertical drive shaft 6, which is connected to the drive system 12 positioned on the top of the frame 11 (see FIG. 8).

Having a multiple set of stationary discs and rotary paddle wheels mounted over the other on the same shaft also give the advantage to mix finished product produced out of a different recipes fed into different levels of texturizing units and falling into the same collection bin, i.e. vegetable protein in one unit, ground meat in second and meat chunks in third unit.

Figure 10:
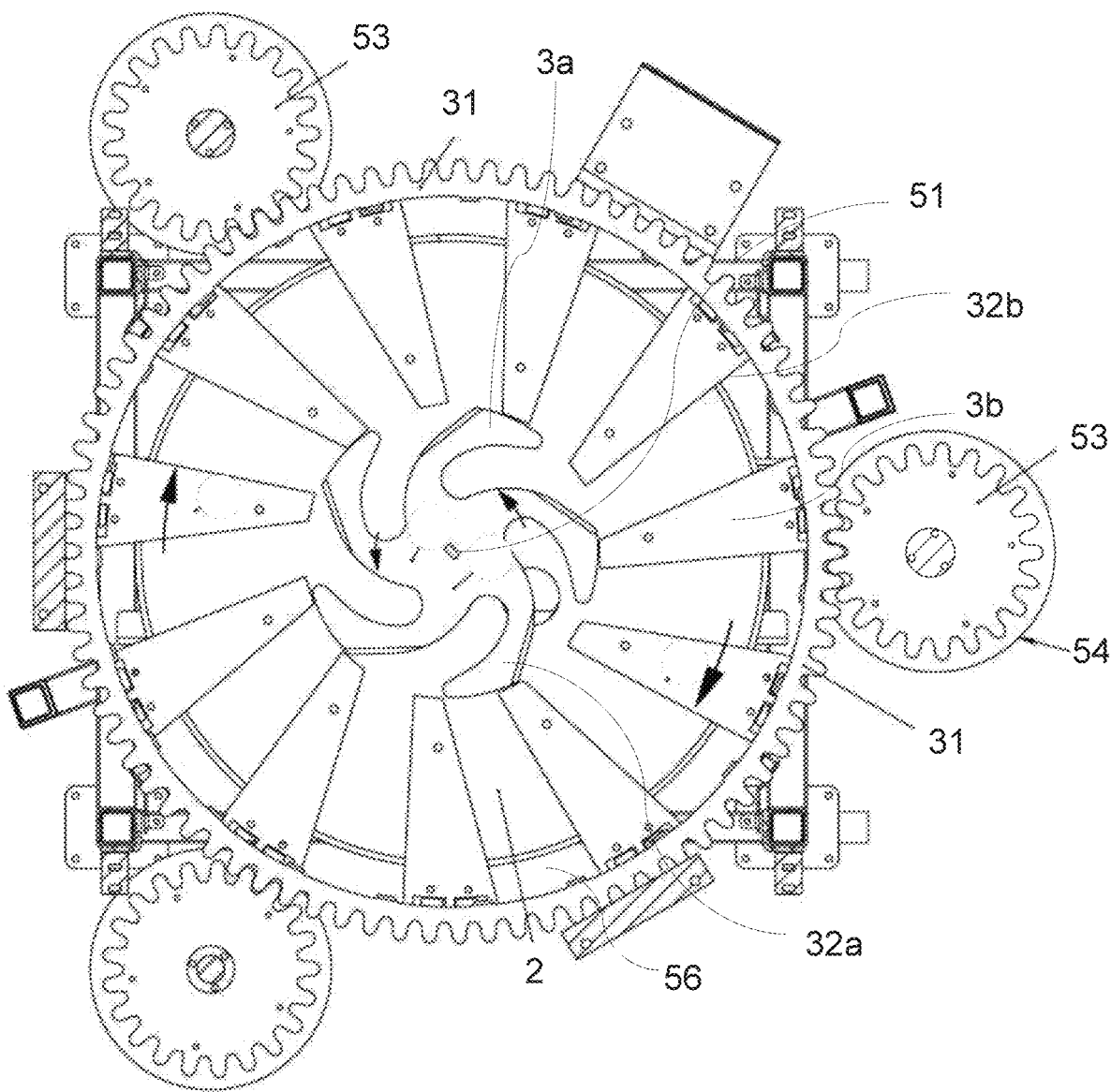
FIG. 10 shows a rotary paddle wheel according to another embodiment of the invention.

FIG. 10 shows another embodiment of the texturizer, where the rotary paddle wheel comprises a first rotary paddle wheel 3a with first spokes 32a and a second rotary paddle wheel 3b with second spokes 32b, wherein the first rotary paddle wheel and the second rotary paddle wheel are concentric and rotating around the same rotation axis 51. The second rotary paddle wheel 3b having an annular shape surrounds the first rotary paddle wheel 3a. The first rotary paddle wheel 3a and the second rotary paddle wheel 3b are positioned in the same plane between a first stationary disc (not shown) and a second stationary disc 2. Preferably, the first rotary paddle wheel 3a and the second rotary paddle wheel 3b will have a thickness corresponding to the distance between the first stationary disc and the second stationary disc.

The second spokes 32b are attached to a toothed periphery 31, which is driven by in this embodiment three cogwheels 53 and motors 54. It is also possible to rotate the second rotary paddle wheel 3b by only one or two cogwheels and motors. The toothed periphery 31 has an inner diameter, where the toothed periphery 31 is attached to the second spokes 32b. The second stationary disc has a diameter less than the inner diameter thus defining an opening 56 in between, so that the textured food materials will be pushed and fall down through the opening 56 instead of being pushed over the toothed periphery 31, which would require that the toothed periphery 31 and the cogwheels 53 were cleaned more often. The food materials falling down through the opening 56 will be received by a collection channel (not shown).

The first rotary paddle wheel and the second rotary paddle wheel can be configured to rotate in the same direction at different rotational speeds. The first rotary paddle wheel can be configured to rotate in one direction and the second rotary paddle wheel can be configured to rotate in the opposite direction, which has turned out to effectively transport the food materials away from the inlet opening. The first rotary paddle wheel can be configured to rotate with a speed of 5 to 30 rpm, preferably 10 to 15 rpm. and the second rotating paddle wheel can be configured to rotate with a speed of 1-10 rpm.

Since the circular arc of a circle when the angle is kept unchanged increases in length when moving away from the centre of the circle, the area between the spokes of the rotary paddle wheel(s) increase too in the same direction. To keep the area or volume between the second spokes 32b filled with the food material it will beneficial to have the first rotary paddle wheel 3a configured to rotate faster than the second rotary paddle wheel 3b.

The first rotary paddle wheel 3a and the second rotary paddle wheel 3b can have all the features and advantages described above about the single rotary paddle wheel 3.

Figure 11:
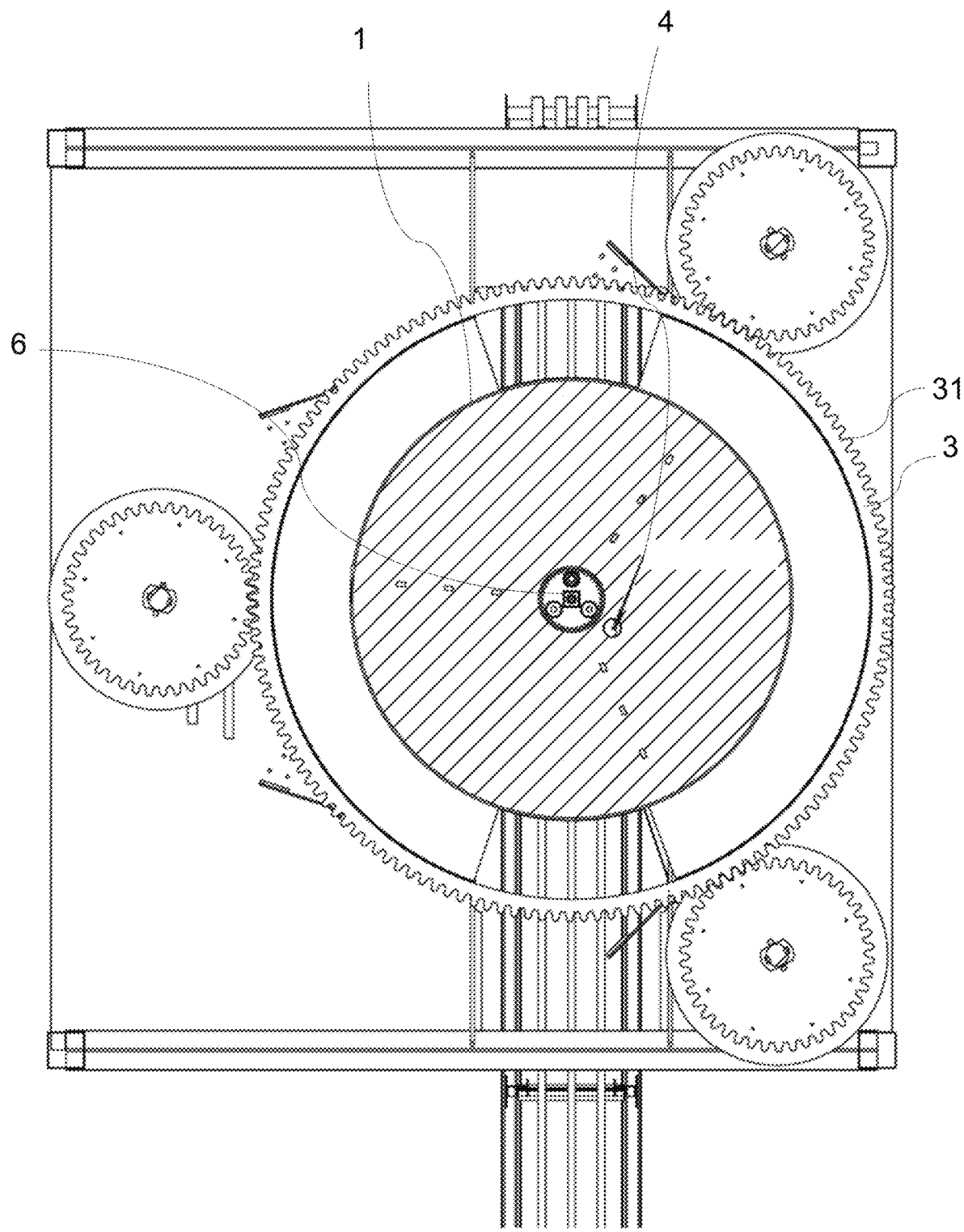
FIG. 11 shows a first stationary disc with an inlet opening offset from the rotation axis of the rotary paddle wheel.

FIG. 11 shows the texturizer with a first stationary disc 1 placed on top of the rotary paddle wheel 3. The first stationary disc 1 has an inlet opening 4 positioned offset from the rotation axis of the rotary paddle wheel. With the inlet opening 4 positioned offset the slurry will fall down between two spokes of the rotary paddle wheel and easily be transported radially out. The offset inlet opening 4 can be combined with any embodiment of the rotary paddle wheel, where the rotary paddle wheel is driven by a drive source through a centre shaft 6, or where the rotary paddle wheel is driven by a drive motor through the periphery 31 of the rotary paddle wheel 3, or where the rotary paddle wheel has one or two the rotary paddle wheels.

Above, the invention is described with reference to some preferred embodiments. However, it is realised that other variant may be provided without departing from the scope of the invention as defined in the accompanying claims.

The invention claimed is:

1. An apparatus for texturizing emulsified protein and/or carbohydrate containing food materials into a textured fibrous meat simulating product, said apparatus comprising a treatment assembly comprising:
   a first stationary disc having an inlet opening for receiving a food material slurry;
   a second stationary disc arranged underneath the first stationary disc with a predetermined distance between said first and second stationary discs defining a treatment space between the stationary discs, wherein one or both of the first and second stationary discs are configured for being heated; and
   a rotary paddle wheel, comprising spokes as part of the rotary paddle wheel, configured for rotating relative to the first and second stationary discs around a rotation axis, wherein the rotary paddle wheel is arranged between the first and second stationary discs for during rotation of the rotary paddle wheel transporting the food material slurry from the inlet opening to a periphery of the stationary discs thereby heating and texturizing the food material slurry.

2. The apparatus according to claim 1, wherein the apparatus further comprises a collection channel provided peripherally around the treatment assembly for receiving the treated product being discharged between the stationary discs.

3. The apparatus according to claim 1, wherein a diameter of the first and second, heated stationary discs is between 0.50 to 2.00 m, and the predetermined distance between the stationary discs is between 5 to 50 mm.

4. The apparatus according to claim 1, wherein the rotary paddle wheel has a height, which is the same as the distance between the two stationary discs.

5. The apparatus according to claim 1, wherein the rotary paddle wheel comprises the spokes formed as cleats such that the food material is scraped and pressed whilst being transported from the inlet opening to the periphery of the stationary discs.

6. The apparatus according to claim 1, wherein the apparatus further comprises at least one motor configured for rotating the rotary paddle wheel.

7. The apparatus according to claim 1, wherein the rotary paddle wheel is driven by a central drive shaft connected to a drive source.

8. The apparatus according to claim 1, wherein the rotary paddle wheel is a drive gear sprocket with at least one drive motor provided to engage a periphery of said rotary paddle wheel.

9. The apparatus according to claim 7, wherein the drive source is speed-adjustable.

10. The apparatus according to claim 1, wherein one or both of the first and second stationary discs has/have heating elements configured for heating the first and/or second stationary discs to a temperature of 100-200° C.

11. The apparatus according to claim 1, wherein one or both of the first and second stationary discs have an inner heating element, surrounded by a first outer annular heating element, wherein the heating elements are configured for heating the first and/or second stationary discs.

12. The apparatus according to claim 11, wherein the inner heating element(s) is/are configured for heating an inner section of the first stationary disc and/or the second stationary disc comprising between 0 to 40% and 0 to 60% of a radius of the first stationary disc and/or the second stationary disc, wherein the first annular heating element(s) is/are configured for heating a first annular section of the first stationary disc and/or the second stationary disc surrounding the inner section.

13. The apparatus according to claim 11, wherein the inner heating element is configured for being heated to a first temperature, and wherein the first outer annular heating element is configured for being heated to a second temperature, wherein the second temperature is lower than the first temperature.

14. The apparatus according to claim 13, wherein the first temperature is 80-120° C., wherein the second temperature is 60-100° C.

15. The apparatus according to claim 13, wherein the first temperature is 60-100° C., wherein the second temperature is 55-85° C.

16. The apparatus according to claim 1, wherein the inlet opening comprises an inlet heating element configured for heating the inlet opening.

17. The apparatus according to claim 1, wherein the first and second stationary discs and the rotary paddle wheel define a set, the apparatus comprising multiple sets of stationary discs and rotary paddle wheels all mounted on a common central shaft.

18. The apparatus according to claim 1, wherein the inlet opening is positioned off the rotation axis of the rotary paddle wheel.

19. The apparatus according to claim 1, wherein the rotary paddle wheel comprises:
   a first rotary paddle wheel with first spokes, and
   a second rotary paddle wheel with second spokes,
      wherein the second rotary paddle wheel has an annular shape and the first rotary paddle wheel is configured to rotate inside the second rotary paddle wheel.

20. The apparatus according to claim 19, wherein the first rotary paddle wheel and the second rotary paddle wheel are configured to rotate in opposite directions.

21. The apparatus according to claim 19, wherein the apparatus further comprises:
- a drive source configured for driving the first rotary paddle wheel by a central drive shaft and/or
- a drive motor configured for engaging and rotating a drive gear sprocket of the second rotary paddle wheel.

22. The apparatus according to claim 19, wherein the first rotary paddle wheel has an first outer diameter and the second rotary paddle wheel has an second outer diameter, wherein the first outer diameter is between 20% and 60% of the second outer diameter.

23. The apparatus according to claim 19, wherein the first spokes have first leading edges and the second spokes have second leading edges, wherein the first leading edges and the second leading edges are configured to push the food material slurry when the first and second rotary paddle wheels are rotating, wherein the first leading edges form a first angle when the first leading edges intersect a radius originating in the rotation axis, wherein the second leading edges form a second angle when the second leading edges intersect the radius, wherein the first angle is greater than the second angle.

24. The apparatus according to claim 23, wherein the first leading edges are convex.

25. A method of texturing an emulsified protein and/or carbohydrate containing food materials into a textured fibrous meat simulating product, said method comprising the steps of:
- providing an apparatus for texturizing the emulsified protein and/or the carbohydrate containing food materials into the textured fibrous meat simulating product, said apparatus comprises a treatment assembly comprising:
  - a first stationary disc having an inlet opening for receiving a food material slurry;
  - a second stationary disc arranged underneath the first stationary disc with a predetermined distance between said first and second stationary discs defining a treatment space between the stationary discs, wherein one or both of the first and second stationary discs are configured for being heated; and
  - a rotary paddle wheel, comprising spokes as part of the rotary paddle wheel, configured for rotating relative to the first and second stationary discs around a rotation axis, wherein the rotary paddle wheel is arranged between the first and second stationary discs for during rotation of the rotary paddle wheel transporting the food material slurry from the inlet opening to a periphery of the stationary discs thereby heating and texturizing the food material slurry;
- supplying the food material slurry through the inlet opening of the first stationary disc; and
- compressing and heating the food material slurry in the treatment space between the first stationary disc and the second stationary disc by rotating the rotary paddle wheel around the rotation axis while heating the food material slurry and thereby texturizing the food material slurry and obtaining the textured product at the periphery of the stationary discs.

26. The method according to claim 25, wherein said inlet opening is in a central portion of said first stationary disc.

27. The method according to claim 25, wherein the rotary paddle wheel is placed between the two stationary discs, wherein the two stationary discs are horizontally positioned.

28. The method according to claim 25, further comprising a step of controlling a rotating speed of the rotary paddle wheel and temperature of the stationary discs for the treated product to be sufficiently shifted and heat treated to have the textured fibrous meat simulating structure and colour.

29. The method according to claim 28, wherein the rotary paddle wheel is rotated with the rotating speed of 5 to 30 rpm, and/or wherein one or both of the first and second stationary discs are heated to the temperature of 100-200° C.

* * * * *